Dec. 23, 1947.  F. E. HANSEN  2,433,119

HOSE COUPLING

Filed June 2, 1944

INVENTOR.
FRED E. HANSEN
BY
Kwis Hudson Boughton & Williams
ATTORNEYS

Patented Dec. 23, 1947

2,433,119

UNITED STATES PATENT OFFICE 2,433,119

HOSE COUPLING

Fred E. Hansen, Lakewood, Ohio

Application June 2, 1944, Serial No. 538,368

1 Claim. (Cl. 285—169)

This invention relates to improvements in hose couplings, more particularly quickly detachable couplings.

The coupling of the present invention is of the type disclosed in my Patent No. 2,092,116, issued September 7, 1937, in which the coupling members are normally locked together but may be unlocked by applying force to move axially a sleeve that is mounted on one of the members. Occasionally this sleeve is moved accidentally, as when a length of hose incorporating the coupling is dragged over a floor in such a way as to cause the sleeve to encounter some fixed object.

The primary purpose of the present invention is the provision of means in a coupling of this type for preventing accidental operation of the said sleeve.

Other objects and features of novelty will appear as I proceed with the description of that embodiment of the invention which, for the purposes of the present application, I have illustrated in the accompanying drawing, in which Fig. 1 is an axial sectional view through a coupling embodying the invention, the coupling members being locked in coupling relation, and the means for preventing accidental operation being in effective position.

Figure 1:
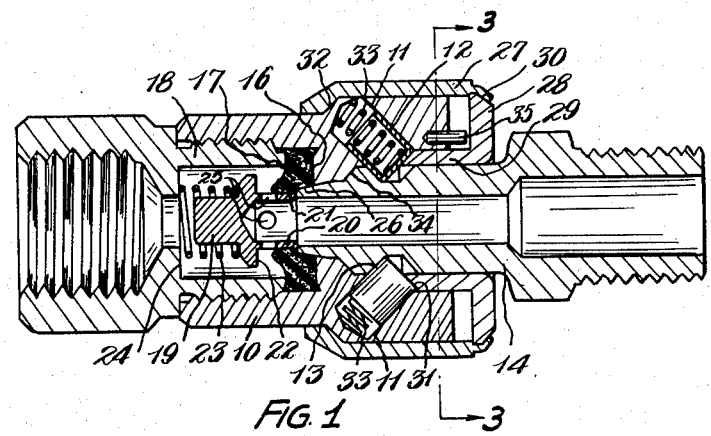

In the drawing the female member of the coupling is shown at 10. It is provided with a central bore and a plurality of cylindrical recesses 11 of which there are preferably three, inclined to the axis of the coupling and communicating with the central bore thereof. Disposed in each of these recesses 11, there is a hollow cylindrical detent 12, which is adapted to engage a beveled shoulder 13 on the male member 14 for the purpose of maintaining the members in coupled relation, as shown in Fig. 1.

The female member 10 is provided with an internal shoulder 16 against which there is clamped in sealing engagement a gasket 17, preferably of soft rubbber, the gasket being secured in position by a fitting 18. A valve 19 has a tubular extension 20 projecting through the central hole 21 of the gasket, and an annular flange 22 adapted to engage one side of the gasket when the coupling is disengaged and to thereby seal the female member. A coil spring 23 is arranged between the wall 24 and the flange 22 so as to force the latter against the gasket 17 and thus prevent leakage of pressure fluid out of the female member when the two members are disengaged. The extension 20 is provided with lateral ports 25, and when the valve is in its open position as shown in the drawing, the pressure fluid is free to flow through these ports. The extremity 26 of the male member 14 is adapted to engage with the valve extension 20 to force the valve to its open position when the male member 14 is moved into coupling relation with the female member, as shown in Fig. 1.

Slidably and rotatably mounted on the exterior of the female member 10 there is an outer sleeve 27 to which is secured an annular flange 28 that is integral with an inner sleeve 29. The two sleeves may be secured together by causing the flange 28 to engage an internal shoulder on the outer sleeve and spinning the metal of the outer sleeve down over the flange 28 as shown at 30. The inner end of the inner sleeve 29 is beveled as indicated at 31, and cooperating beveled shoulders 32 on the outer surface of member 10 and the inner surface of sleeve 27 limit the movement of the sleeves 27 and 29 toward the right as seen in the drawing, so that the sleeve 29 will always underlie the detents 12 and retain them in the cylindrical recesses 11.

Each of the detents 12 is biased towards the axis of the coupling by a coil spring 33 which maintains the detent in engagement at all times with the beveled end 31 of the inner sleeve and in engagement with the shoulder 13 when the members are coupled together. The male member 14 has a beveled circumferential shoulder 34 which is adapted to engage the inner ends of the detents 12 and force them outwardly when the male member is moved into coupling relation with the female member. As soon as the hump between the shoulders 34 and 13 passes the innermost corners of the detents however springs 33 cause them to snap back into the locking position of Fig. 1.

Figure 2:
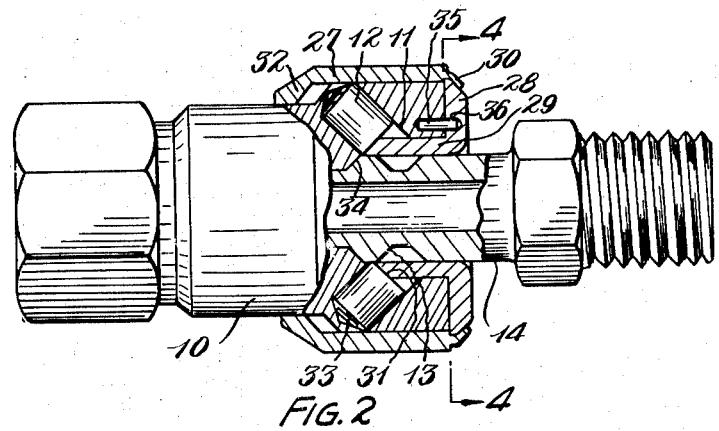
Fig. 2 is an elevational view, partly in axial section, showing the members of the coupling in unlocked condition ready for separation, the sleeve in this view having been rotated to an angular position such that the means for preventing its sliding movement is disabled.
Figure 3:
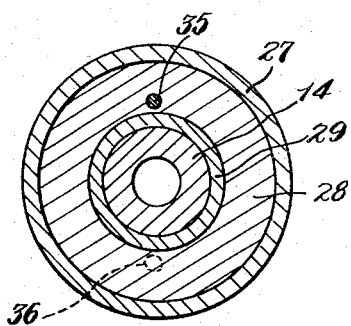
Fig. 3 is a cross-sectional view taken substantially on the line 3—3 of Fig. 1.
Figure 4:
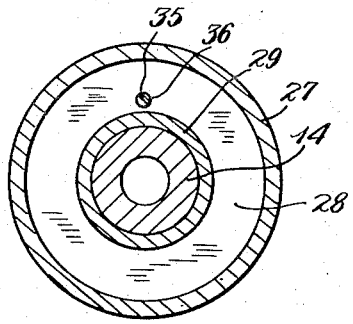
Fig. 4 is a similar view taken on line 4—4 of Fig. 2.

35 is a stop pin which is fixed in the female member 10 and extends a short distance from the end face thereof as shown in Fig. 1. When the parts are in the positions illustrated in that figure, sleeves 27 and 29 cannot be slid to the left far enough to dislodge detents 12 from engagement with the shoulder 13. In the flange 28 however, there is a socket 36 which is adapted to receive pin 35 when the sleeve assembly 27, 28, 29, is rotated to the proper angular position. Then this assembly may be slid to the left as indicated in Fig. 2. While I prefer to employ a single socket 36, it will be apparent that two or more such sockets may be used if desired.

Assuming that the parts are in the position illustrated in Fig. 1, and that it is desired to uncouple the members 10 and 14, the operator holds the outer sleeve 27 in one hand and the member 14 in the other, and first turns the sleeve assembly 27, 28, 29, exerting a slight pull in the meantime, until the socket 36 comes into register with stop pin 35. When the operator discovers by the sense of feeling that this has taken place, he exerts a stronger pull, causing the beveled inner end 31 of the inner sleeve 29 to cam the detents 12 outwardly against their springs 33 until they entirely disengage shoulder 13, whereupon the male member 14 of the coupling may be pulled out of coupling relation with the female member.

When the two members of the coupling are separated, the springs 33 acting through the detents against the beveled end of the sleeve 29, hold the sleeve assembly in the position of Fig. 1, the movement of the sleeve assembly toward the right being limited by the beveled surfaces 32. The detents cannot be dislodged from the recesses 11, since they are held therein by the beveled end 31 of sleeve 29. When the members 10 and 14 have been coupled together, the sleeve assembly is rotated preferably about 180°, although any other angular position in which the pin and socket 35 and 36 are out of alignment is sufficient to prevent accidental sliding movement of the sleeve assembly and consequent disengagement of the coupling.

Having thus described my invention, I claim:

In a coupling of the character described, the combination of male and female members, one of said members having an annular shoulder, the other member having detents movable into and out of engagement with said shoulder and adapted by such engagement to lock said members in coupled relation, said members being separable by longitudinal movement only when said detents are withdrawn from engagement with said shoulder, a sleeve slidable and rotatable upon one of said members, said sleeve having a cam surface effective upon movement of the sleeve lengthwise of the coupling for withdrawing said detents from engagement with said shoulder, said last named member and said sleeve having pin and socket means permitting sliding movement of the sleeve in one angular position of the sleeve and preventing sliding movement in other positions.

FRED E. HANSEN.

REFERENCES CITED

The following references are of record in the file of this patent:

UNITED STATES PATENTS

| Number | Name | Date |
|---|---|---|
| 2,092,116 | Hansen | Sept. 7, 1937 |
| 660,225 | Smith | Oct. 23, 1900 |
| 2,069,377 | Matthiessen, Jr. | Feb. 2, 1937 |
| 1,857,420 | Wolford | May 10, 1932 |
| 2,050,647 | Carter | Aug. 11, 1936 |
| 2,333,423 | Hufferd | Nov. 2, 1943 |